(12) United States Patent
Stone et al.

(10) Patent No.: US 7,180,756 B2
(45) Date of Patent: Feb. 20, 2007

(54) LATCH MECHANISM

(75) Inventors: Frank H. Stone, Waukegan, IL (US); Joseph L. Allore, Mundelien, IL (US); Anthony J. Richter, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 188 days.

(21) Appl. No.: 10/874,062

(22) Filed: Jun. 21, 2004

(65) Prior Publication Data

US 2005/0281006 A1 Dec. 22, 2005

(51) Int. Cl.
*H04B 1/03* (2006.01)
*H05K 7/18* (2006.01)
*H04M 1/00* (2006.01)

(52) U.S. Cl. .................. 361/814; 361/798; 455/575

(58) Field of Classification Search ................ 312/215, 312/216, 223.1, 223.2; 361/801, 754, 798; 455/575, 347
See application file for complete search history.

(56) References Cited

U.S. PATENT DOCUMENTS

| | | | |
|---|---|---|---|
| 5,457,744 A | 10/1995 | Stone et al. | |
| 5,995,373 A | 11/1999 | Nagai | |
| 6,011,699 A * | 1/2000 | Murray et al. | 361/814 |
| 6,275,376 B1 * | 8/2001 | Moon | 361/683 |
| 6,317,315 B1 * | 11/2001 | Lee et al. | 361/681 |
| 6,480,397 B1 * | 11/2002 | Hsu et al. | 361/814 |
| 6,512,670 B1 * | 1/2003 | Boehme et al. | 361/681 |
| 6,587,332 B2 * | 7/2003 | Herranen et al. | 361/680 |
| 6,600,662 B1 * | 7/2003 | Emmert et al. | 361/814 |
| 6,700,784 B2 * | 3/2004 | Huang et al. | 361/715 |

* cited by examiner

*Primary Examiner*—Kamand Cuneo
*Assistant Examiner*—Hung Thanh Nguyen
(74) *Attorney, Agent, or Firm*—Lawrence J. Chapa

(57) ABSTRACT

A latch mechanism (1200) comprises a resilient wire (404) supported proximate its first end (412) and second end (414) by a support structure (406). The latch mechanism (1200) also includes one or more hook shaped catches (218) that have cammed outer surfaces (302) and wire engaging openings (304). To engage the latch mechanism (1200) the resilient wire (404) is urged against the cammed outer surfaces (302) bending the resilient wire (404) and allowing the resilient wire to rebound into the wire engaging openings (304). To disengage the latch mechanism the resilient wire (404) is deflected, e.g., by pushing a moveable manual actuator (408) that is engaged with the wire, in order to release the resilient wire (404) from the wire engaging openings (304) of the catches (218).

26 Claims, 7 Drawing Sheets

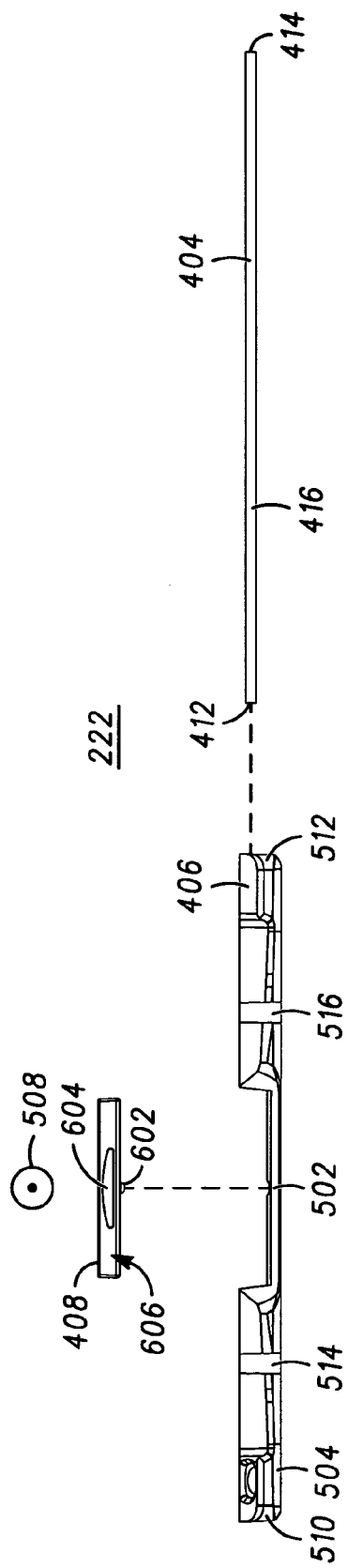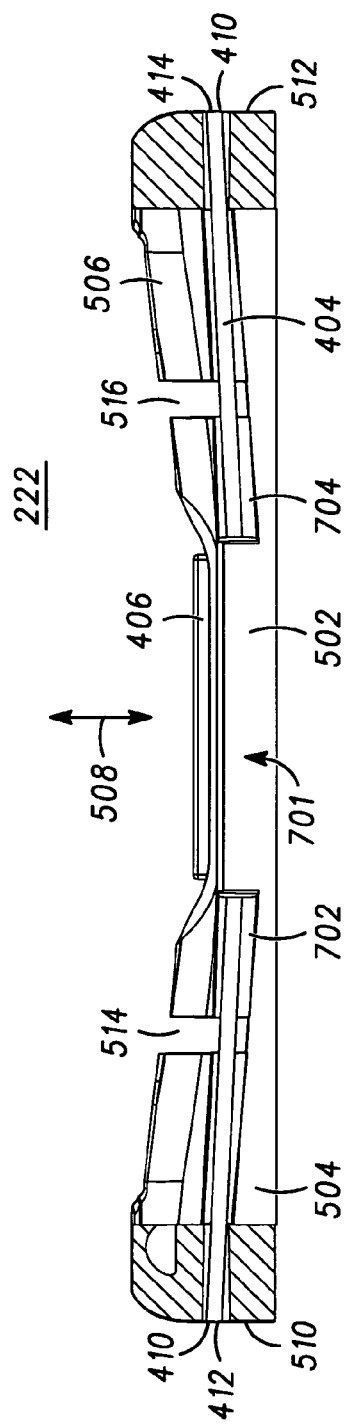

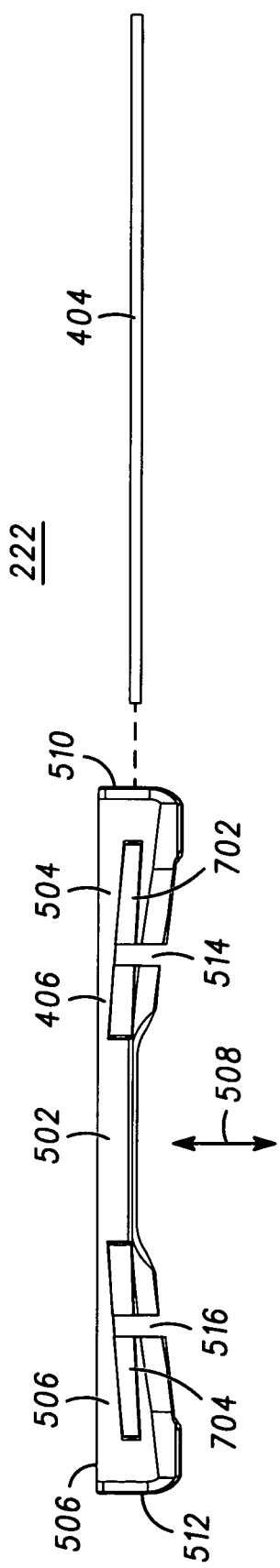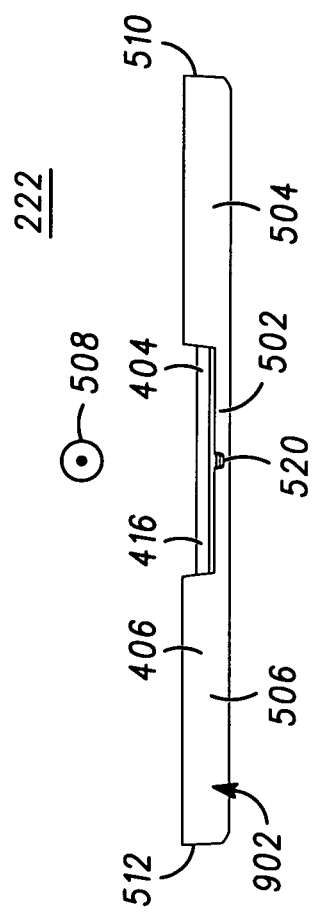

LATCH MECHANISM

FIELD OF THE INVENTION

The present invention relates in general to latch mechanisms. More particularly, the present invention relates to space efficient latch mechanisms for small portable electronic devices.

BACKGROUND OF THE INVENTION

There is an interest in making certain portable devices such as cellular telephones smaller. Making such devices smaller makes it more convenient to carry them around at all times.

Concurrently there is a trend toward increasing the functionality of devices. In the case of cellular telephones, increased functionality includes providing operability on multiple frequency bands using multiple protocols, and providing the ability to take photographs and/or video clips. Adding more functionality often leads to increased space requirements, which is at odds with the desire to make the devices smaller. Furthermore, depending upon the desired overall dimensions of the device, some of the dimensions for some of the components may be more critical than other dimensions. Thus, the amount of space, i.e. volume, available for accommodating components is at premium. Still further, the desire to accommodate more critical dimensions for one or more of the components is also a factor to be considered.

One component found in portable electronic devices such as cellular telephones, is a latch used to secure battery compartment covers. It is desirable to have a latch mechanism that takes up less space, relative to at least one or more dimensions.

BRIEF DESCRIPTION OF THE FIGURES

The present invention will be described by way of exemplary embodiments, but not limitations, illustrated in the accompanying drawings in which like references denote similar elements, and in which:

FIG. 6 is an exploded front view of the clasp shown in FIG. 4;

FIG. 7 is a partial cross-sectional bottom view of the clasp shown in FIG. 4;

FIG. 8 is an exploded bottom view of the clasp shown in FIG. 4;

FIG. 9 is a back view of the clasp shown in FIG. 4;

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
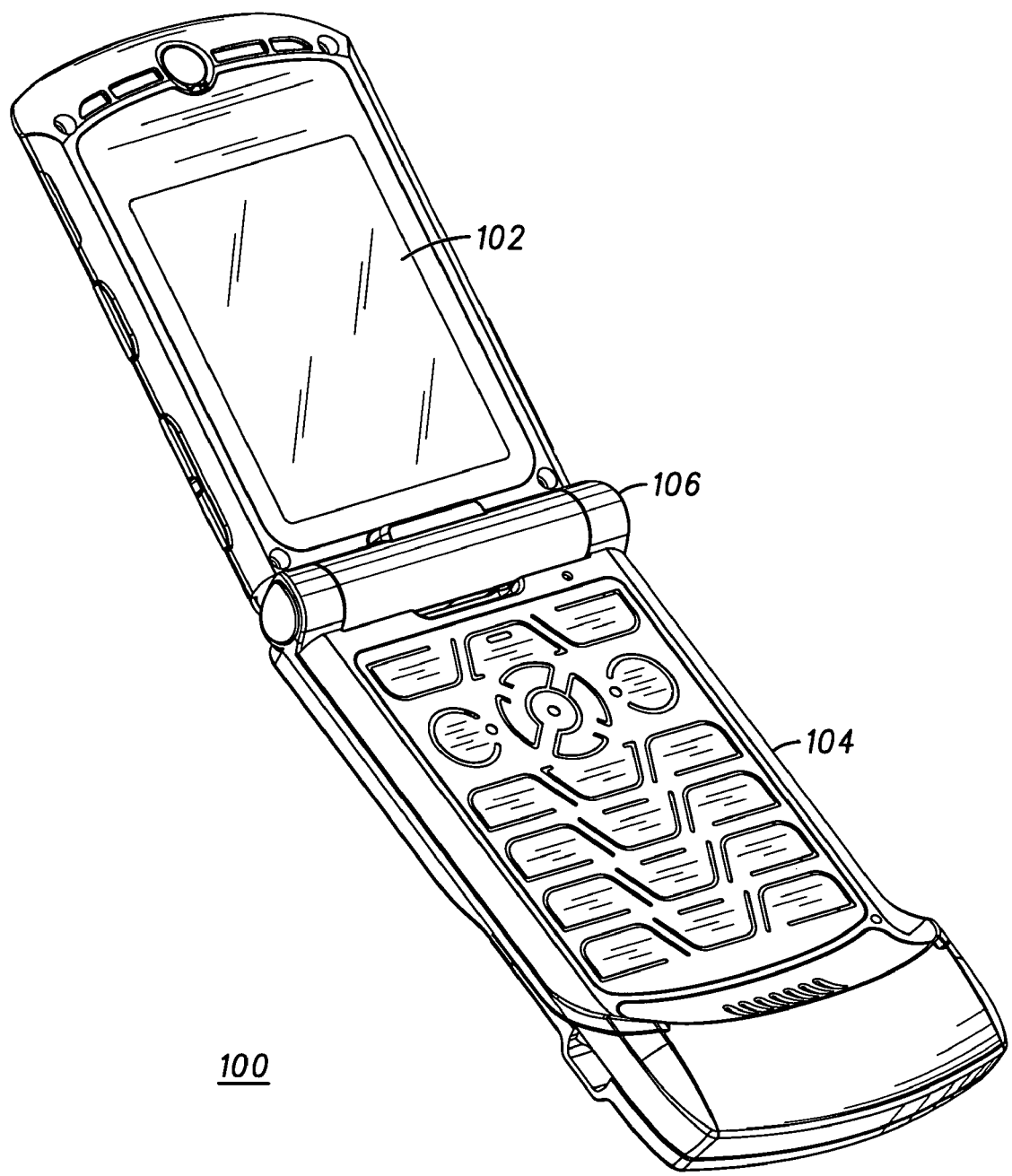
FIG. 1 is a perspective view of a cellular telephone that includes a latch mechanism according to at least one embodiment of the invention.

FIG. 1 is a perspective view of a handheld wireless communication device in particular a cellular telephone 100 that includes a latch mechanism 1200 (not visible in FIG. 1) according to an embodiment of the invention. The assembled latch mechanism 1200 is shown in FIG. 12. Portions of the latch mechanism 1200 are shown in FIGS. 2-11. Although the latch mechanism 1200 described below with reference to FIGS. 2-12 is incorporated in the cellular telephone 100 according to an embodiment of the invention, alternatively the latch mechanism 1200 and variations thereof are applied to a variety of different applications such as, for example, securing battery covers, or connector access covers for other portable electronic devices (e.g., handheld game consoles, MP3 players, handheld GPS receivers, cameras, or camcorders).

The exemplary cellular telephone 100 illustrated in FIG. 1 has a two part housing, which includes an upper part 102, and a lower part 104. The upper part 102 and the lower part 104 are rotatably coupled together via a hinge 106. While the exemplary embodiment illustrates a latch for use with a battery cover relative to a form of a two part housing phone also known as a clam shell style cellular telephone, one skilled in the art will readily appreciate, as previously noted, that the latch could alternatively be used in other types of devices, including devices incorporating other types of housings, such as one part housings, other types of two part housings, as well as housings having more than two parts.

Figure 2:
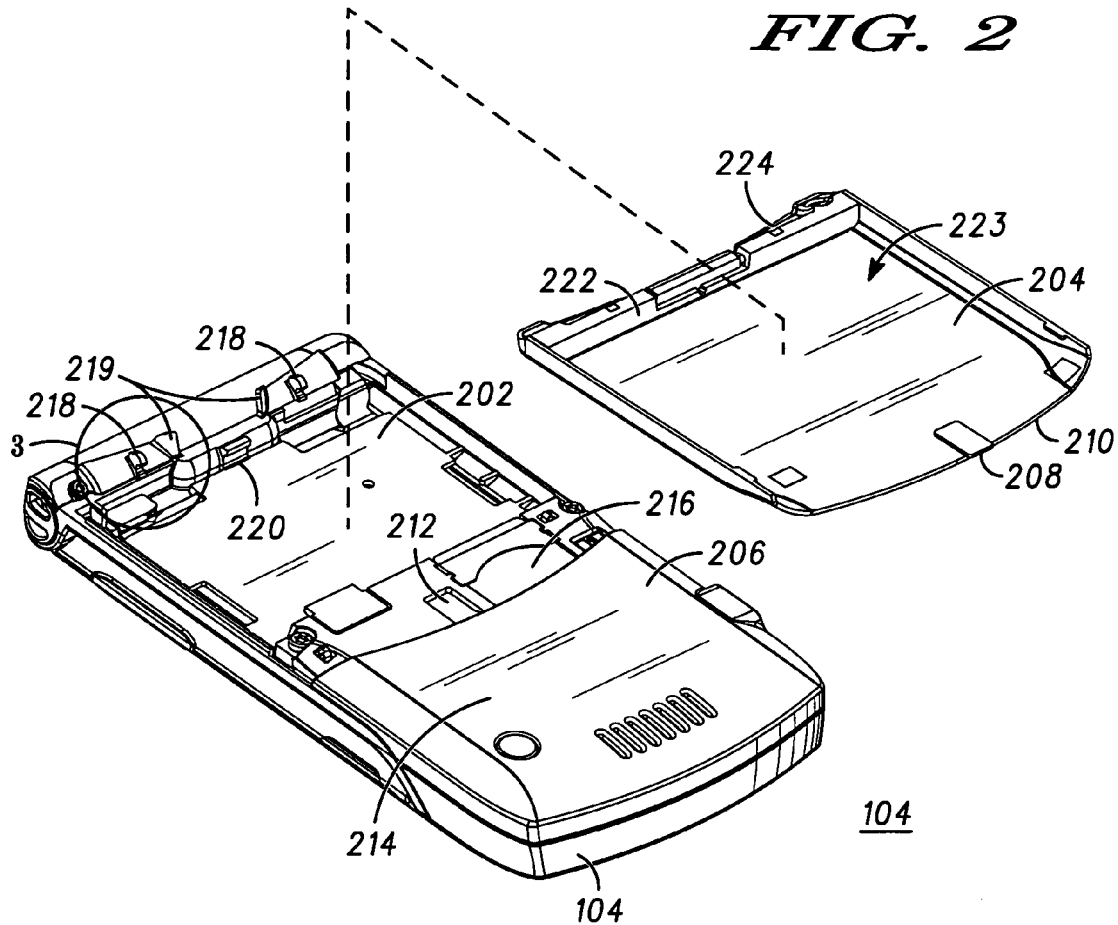
FIG. 2 is a partial exploded view of a reverse perspective of the cellular telephone shown in FIG. 1, showing a battery compartment, and a battery compartment cover that is secured with a latch mechanism according to an embodiment of the invention.

FIG. 2 is a partial exploded view of the cellular telephone 100 shown in FIG. 1, showing a battery compartment 202, and a battery compartment cover 204 that is secured by the latch mechanism 1200 (FIG. 12). The battery compartment 202 is located in a backside 206 of the lower part 104 of the cellular telephone 100. (The backside 206 is not visible in FIG. 1). A tab 208 that is attached to a lower end 210 of the cover 204 aids in securing the cover 204. The tab 208 fits into a congruently shaped recess 212 that is located within the battery compartment 202, and extends under an outer housing wall 214 of the lower part of 104 near a bottom end 216 of the battery compartment 202.

A pair of hook shaped catches 218 is located near a top end 220 of the battery compartment 202. A pair of triangular protrusions 219, each of which are shaped to conform to a top end 224 of the battery compartment cover 204, extend outward from positions at the top end 220 of the battery compartment 202 between the catches 218. The triangular protrusions 219 help to locate the battery compartment cover 204. A clasp 222 of the latch mechanism 1200 (FIG. 12) is attached to an inside surface 223 of the battery compartment cover 204 adjacent the top end 224 of the battery compartment cover 204. The clasp 222 is suitably attached by adhesive. Alternatively, the clasp 204 and the cover are integrally molded.

In order to fit the battery compartment cover 204 to the battery compartment 202, the tab 208 is first placed in the recess 212 so that it extends under the outer housing wall 214. The top end 224 of the battery compartment cover 204 is then pushed toward the cellular telephone 100 so that the clasp 222 will engage with the hook shaped catches 218. The structure of the catches 218 and the clasp 222 is described in more detail hereinbelow. Alternatively the lower end 210 of the cover 204 could be hinged to the lower part 104 of the cellular telephone 100.

Figure 3:
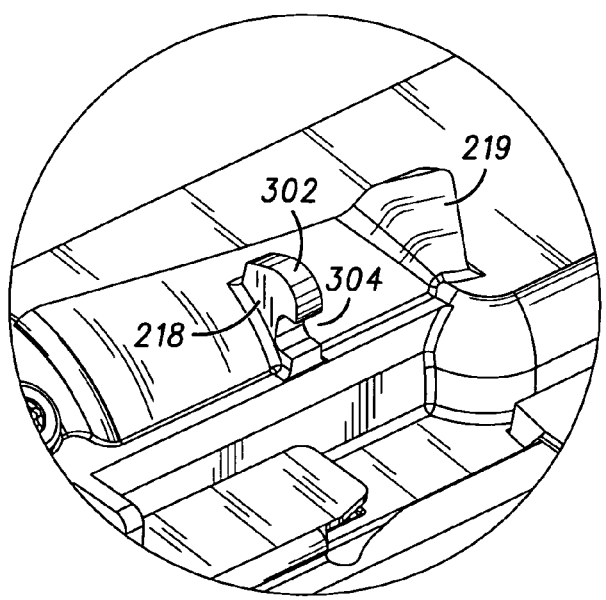
FIG. 3 is a magnified view of a catch of the latch mechanism according to an embodiment of the invention.

FIG. 3 is a magnified view of one of the hooked shaped catches 218 of the latch mechanism 1200 (FIG. 12) according to an embodiment of the invention. As shown in FIG. 3 the catches 218 each comprise an outer cammed surface 302, and a wire engaging opening 304. The function of the cammed surface 302 is similarly described in more detail hereinbelow.

Figure 4:
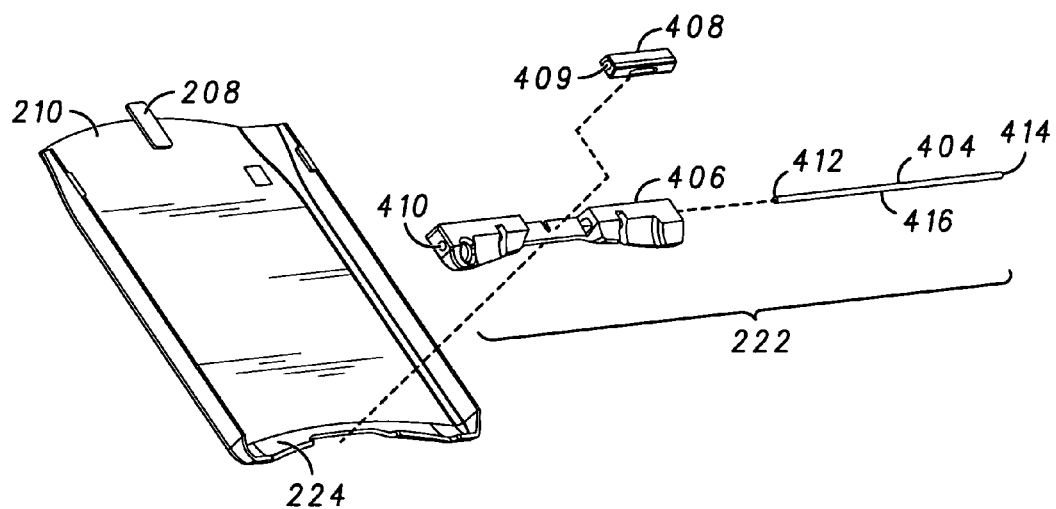
FIG. 4 is an exploded view of the battery compartment cover shown in FIG. 2, including a clasp of the latch.

FIG. 4 is an exploded view of the battery compartment cover shown in FIG. 2, including the clasp 222 of the latch mechanism 1200. As shown in FIG. 4, the clasp 222 comprises a resilient wire 404, a support structure 406, and a moveable manual actuator 408. Inserting the resilient wire 404 into the support structure 406 and through an axial bore 409 in the moveable manual actuator 408 assembles the clasp 222. The resilient wire 404 comprises first end 412 a second end 414 and a middle portion 416 with which the moveable manual actuator 408 engages. The clasp 222 is described in more detail hereinbelow.

Figure 5:
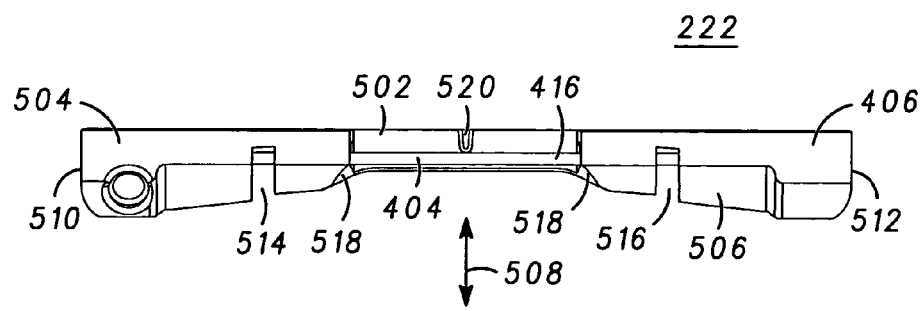
FIG. 5 is a top view of the clasp shown in FIG. 4.

FIGS. 5-10 are several views of the clasp 222. In particular, FIG. 5 is a top view of the clasp 222 without the actuator 408, FIG. 6 is an exploded front view of the clasp 222, FIG. 7 is a partially cross-sectioned bottom view of the clasp 222, FIG. 8 is an exploded bottom view of the clasp 222 without the actuator 408 and FIG. 9 is a back view of the clasp 222 without the actuator 408. Note that the clasp 222 is attached to the cover 204 such that a back end 902 of the support structure 406 shown in FIG. 9 faces the top end 224 of the cover 204, and a bottom end 701 of the support structure 406 shown in FIG. 7 is positioned on the inside surface 223 of the cover 204.

Referring to FIGS. 5–9, support structure 406 comprises a middle section 502, a first end section 504, and a second end section 506. A first longitudinally extending channel 702 is formed in the first end section 504, and a second longitudinally extending channel 704 is formed in the second end section 506. An axis of movement of a middle portion 416 of resilient wire 404 is marked with reference numeral 508. In at least some embodiments, a force which produces the movement of the middle portion 416 of the resilient wire 404 is applied to the manual actuator 408. One skilled in the art will also appreciate that the axis of movement can also be produced by a force applied directly to the resilient wire. In the perspective of FIGS. 5, 7, 8 the axis of movement 508 is vertical and in the perspective of FIGS. 6, 9 the axis of movement 508 is perpendicular to the plane of the drawing sheet.

The cross-sectional dimensions of the channels 702, 704, measured parallel to the axis of movement 508 of the actuator 408, taper from a smaller size that is only slightly larger than a cross-sectional dimension of the resilient wire 404 (measured parallel to the axis of movement of the actuator 508) near a first end 510, and a second end 512 of the support structure 406 to a large size that is significantly larger than (e.g. two-times) the cross-sectional dimension of the resilient wire 404 proximate the middle section 502 of the support structure 406. The channels 702, 704 are rectangular in cross-section along most of their lengths, and are open at the bottom end 701 of the clasp 502 as shown in FIGS. 7-8, however, ends of the channels 702, 704 located at the ends 510, 512 of the support structure 406 are formed into circular cross-section bores 410. The bores 410 help to accurately locate the resilient wire 404. Tapering, the channels 702, 704 allows the resilient wire 404 to flex in order to engage and disengage from the catches 218. Note that the middle portion 416 of the resilient wire 404 is suspended, and within limits is not constrained except by its own resiliency.

A first slot 514 extends perpendicularly from the front (FIG. 6) of the first end section 504 of the support structure 406 into the first channel 702. Similarly, a second slot 516 extends perpendicularly from the front (FIG. 6) of the second end section 506 of the support structure 406 into the second channel 704. When the cover 204 is placed on the battery compartment 202, the catches 218 engage the resilient wire 404 through the first 514 and second 516 slots.

Angled surfaces 518 at the junction of the end sections 504, 506 and the middle section 502 match the shape of the triangular protrusions 219 and aid in locating the cover 204 on the battery compartment 202.

The middle section 502 includes a centrally located groove 520 that extends from the back end 902 of the support structure 406 perpendicularly with respect to the resilient wire 404. A protrusion 602 extending from the actuator 408 locates in the groove 520. The protrusion 602 and the groove 520 serve to constrain the motion of the actuator 408 to be perpendicular to resilient wire 404, at the location of the actuator 408. (Note that the maximum deflection of the resilient wire 404 is very slight in the embodiment shown in the FIG., e.g. equal to one or two diameters of the wire 404.)

A fingernail hold 604 is provided in an actuation surface 606 of the moveable manual actuator 408. The fingernail hold 604 is used to apply a force to separate the cover 204, from the lower part 104 of the cellular telephone 100.

Figure 10:
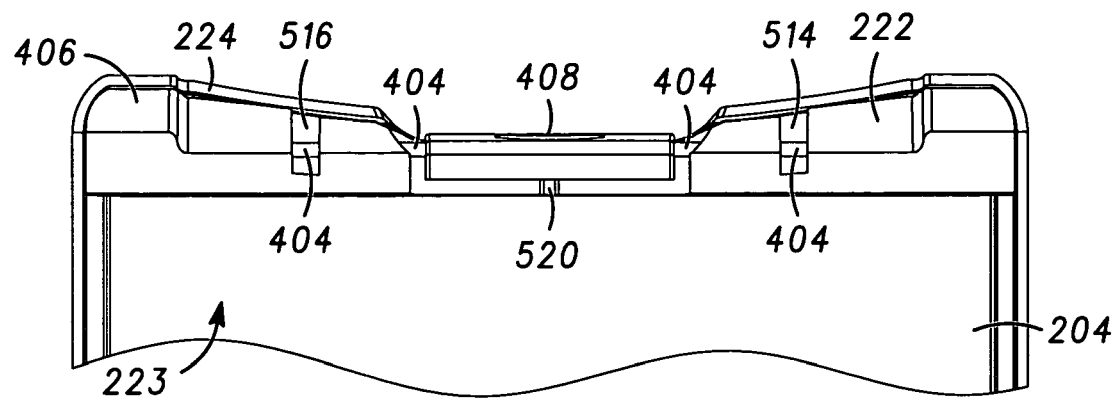
FIG. 10 is a partial internal view of the battery compartment cover shown in FIG. 2 showing the clasp in a first state.

FIG. 10 is a fragmentary inside view of the battery compartment cover 204 shown in FIG. 2 showing the clasp 222 in a first state. The clasp 222 is in the state shown in FIG. 10 when the cover 204 is in place on the compartment 202, and the catches 218 are located in the slots 514, 516 and engaged with the resilient wire 404. The clasp is also in the state shown in FIG. 10, when the cover 204 is removed from the battery compartment 202, and any deflection force, which may have been applied to the moveable manual actuator to deflect the wire and release the door has been removed. As shown in FIG. 10, the resilient wire 404 is not under any stress, and is straight.

Figure 11:
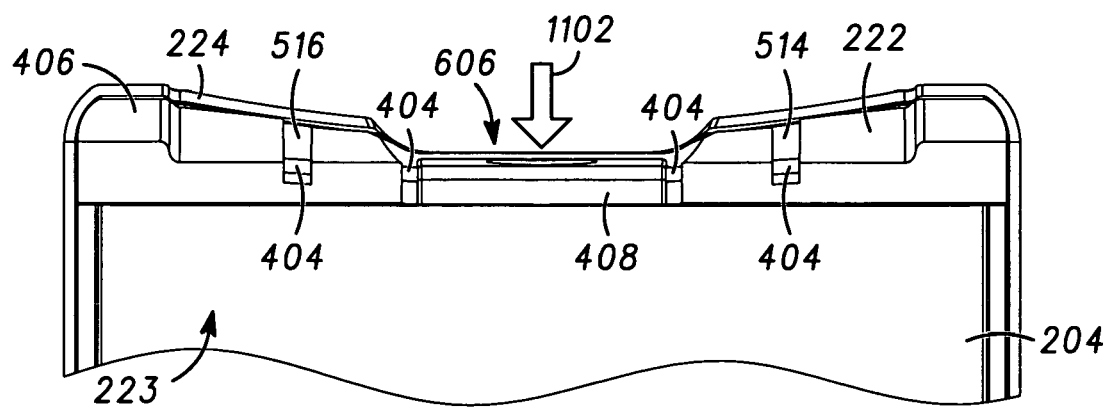
FIG. 11 is a partial internal view of the battery compartment cover shown in FIG. 2 showing the clasp in a second state.
Figure 12:
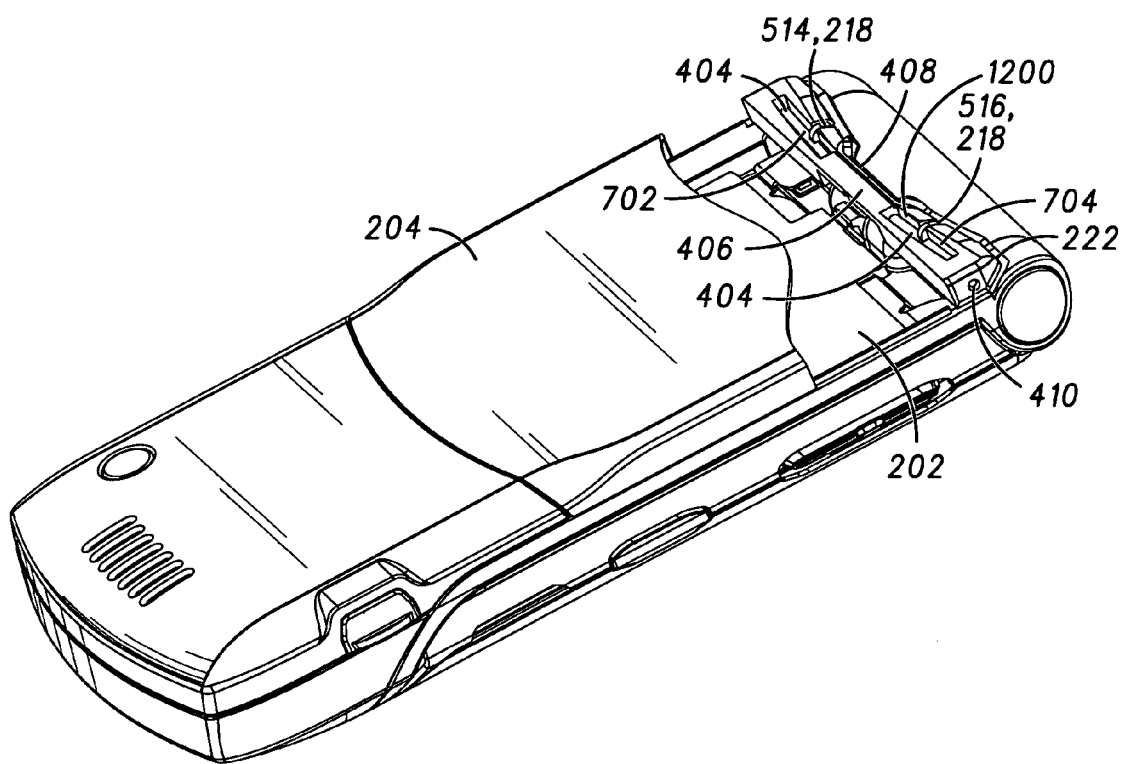
FIG. 12 is a partial perspective view of the cellular telephone shown in FIG. 1 with portion cut away showing the battery compartment cover latched to the battery compartment.

FIG. 11 is a fragmentary inside view of the battery compartment cover shown in FIG. 2 showing the clasp 222 in a second state. The second state shown in FIG. 11 occurs during the processes of engaging and disengaging the clasp

222. In disengaging the clasp 222, a first force labeled 1102 is applied (e.g., with a fingernail) to the moveable manual actuator 408, perpendicular to the actuation surface 606, causing the resilient wire 404 to bow downward. As the resilient wire 404 bows downward, portions of the resilient wire 404 that are located in the slots 514, 516 in the support structure 406 move downward clear of the catches 218. Using the fingernail hold 604 a second force (directed into the plane of the drawing sheet, in the perspective of FIGS. 10–11) is then applied to separate the cover 204 from the compartment 202. One skilled in the art will readily appreciate that the second force could alternatively be applied by a preloaded spring like structure, which biases the cover 204 away from the compartment 202, when the resilient wire 404 clears the catches 218.

The state shown in FIG. 10 can similarly occur, when the wire 404 and the corresponding one or more catches 418 of the clasp 222 are engaged. When the clasp 222 is being engaged, after the tab 208 has been placed in the recess 212 and a force is applied to bring the cover 204 into place (e.g. by pushing the cover 204 against the part 104 of the cellular telephone 100) the angle of the outer cammed surfaces 302 of the hook shaped catches 218 will force the resilient wire 404 into the bowed state shown in FIG. 11. Continued pushing of the cover 204 will cause the resilient wire 404 to pass completely over the cammed surfaces 302 and rebound into the wire engaging openings 304 of the catches 218.

FIG. 12 is a cut-away view of the lower part 104 of the cellular telephone 100 shown in FIG. 1 showing the battery compartment cover 204 latched over the battery compartment 202. The battery compartment cover 204 is partially cut-away to reveal the structure of the latch mechanism 1200 including the clasp 222, and the catches 218, and their interrelation when latched together. As shown in FIG. 12, the catches 218 are located in the slots 514, 516 and are engaged with the resilient wire 404.

The above described latch mechanism is very compact in cross-sectional dimensions, and is well adapted for incorporation in the edge of a cover or door in a space efficient manner.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A latch mechanism adapted for use in a portable electronic device, said mechanism comprising:
    a first part comprising one or more catches;
    a second part adapted to latch to said first part, said second part comprising:
        a resilient wire, said resilient wire comprising a first end, a second end and a middle portion located between said first end and said second end;
        a support structure that supports said resilient wire proximate said first end and proximate said second end and allows said middle portion to be deflected; and
        a moveable manual actuator engaged with said middle portion of said resilient wire, said moveable manual actuator being adapted to bend said resilient wire, in response to a first force, from a first configuration in which said resilient wire is engaged with said one or more catches to a second configuration in which said resilient wire is disengaged from said one or more catches.

2. The latch mechanism according to claim 1 wherein:
    said support structure comprises a first channel in which said first end of said resilient wire is received, and a second channel in which said second end or said resilient wire is received, and wherein said first channel and said second channel are axially spaced apart, whereby said middle portion is suspended between said first channel and said second channel.

3. The latch mechanism according to claim 2 wherein:
    said resilient wire is straight in an unstressed state.

4. The latch mechanism according to claim 2 wherein:
    said moveable manual actuator comprises a bore through which said resilient wire passes.

5. The latch mechanism according to claim 2 wherein:
    said first channel has a first transverse dimension measured in a direction parallel to an axis of motion of said moveable manual actuator, at a first point proximate said moveable manual actuator, that is larger than a transverse dimension of said resilient wire, measured in the direction parallel to the axis of motion of said moveable manual actuator; and
    said first channel has a second transverse dimension measured in the direction parallel to the axis of motion of said moveable manual actuator, at a second point proximate said first end of said resilient wire, that is substantially equal to said transverse dimension of said resilient wire.

6. The latch mechanism according to claim 2 wherein:
    said one or more catches comprise a first catch and a second catch that are disposed on opposite sides of said moveable manual actuator.

7. The latch mechanism according to claim 2 wherein:
    said one or more catches comprise a first catch; and
    said support structure comprises a first slot that extends perpendicularly into said first channel, wherein said first catch engages said resilient wire through said first slot.

8. The latch mechanism according to claim 1 wherein:
    one of said second part and said moveable manual actuator comprises a groove oriented perpendicular to said resilient wire, at said groove; and
    one of said second part and said moveable manual actuator comprises a protrusion extending into said groove; whereby, movement of said moveable manual to actuator is constrained to an axis of motion perpendicular to said resilient wire.

9. The latch mechanism according to claim 1 wherein:
    said moveable manual actuator comprises a surface for applying said first force,
    and said surface comprises a fingernail hold that facilitates applying a second force to separate said second part from said first part.

10. The latch mechanism according to claim 1 wherein:
    said one or more catches comprise a catch having a cammed outer surface adapted to bend said resilient wire when said resilient wire is pressed against said catch.

11. A latchable part comprising a latching mechanism, said latching mechanism comprising:
    a resilient wire, said resilient wire comprising a first end, a second end and a middle portion located between said first end and said second end;

a support structure that supports said resilient wire proximate said first end and proximate said second end and allows said middle portion to be deflected; and a moveable manual actuator engaged with said middle portion of said resilient wire, said moveable manual actuator being adapted to bend said resilient wire, in response to a first force, from a first configuration in which said resilient wire is positioned to engage one or more catches to a second configuration in which said resilient wire is positioned to disengage from said one or more catches.

12. The latchable part according to claim 11 comprising a battery compartment cover.

13. The latchable part according to claim 11 wherein:
said support structure comprises a first channel in which said first end of said resilient wire is received, and a second channel in which said second end of said resilient wire is received, and wherein said first channel and said second channel are axially spaced apart, whereby said middle portion is suspended between said first channel and said second channel.

14. The latchable part according to claim 13 wherein:
said resilient wire is straight in an unstressed state.

15. The latchable part according to claim 13 wherein:
said first channel has a first transverse dimension measured in a direction parallel to an axis of motion of said moveable manual actuator, at a first point proximate said moveable manual actuator, that is larger than a transverse dimension of said resilient wire, measured in the direction parallel to the axis of motion of said moveable manual actuator; and said first channel has a second transverse dimension measured in the direction parallel to the axis of motion of said moveable manual actuator, at a second point proximate said first end of said resilient wire, that is substantially equal to said transverse dimension of said resilient wire.

16. The latchable part according to claim 11 wherein:
said moveable manual actuator comprises a bore through which said resilient wire passes.

17. The latchable part according to claim 11 wherein:
one of said latchable part and said moveable manual actuator comprises a groove oriented perpendicular to said resilient wire, at said groove, and
one of said latchable part and said moveable manual actuator comprises a protrusion extending into said groove;
whereby, movement of said moveable manual actuator is constrained to an axis of motion perpendicular to said resilient wire.

18. The latchable part according to claim 11 wherein:
said moveable manual actuator comprises a surface for applying said first force, and said surface comprises a fingernail hold that facilitates applying a second force to remove said second part.

19. A method of operating a latch comprising:
urging a resilient wire via a movable manual actuator in a first direction tat is perpendicular to said resilient wire against a cammed outer surface of a hook so as to deflect said resilient wire in a second direction that is perpendicular to said resilient wire; and continuing to urge said resilient wire via said movable manual actuator in said first direction until said resilient wire passes said cammed outer surface, and said resilient wire rebounds into an opening of said hook, and is captured by said hook.

20. The method according to claim 19 further comprising:
deflecting said resilient wire in said second direction so as to disengage said resilient wire from said hook.

21. A method of operating a latch in a handheld device comprising:
deflecting a resilient wire forming part of a clasp tat is attached to a cover so as to disengage said resilient wire from engaging openings of one or more catches that are attached to other portions of the handheld device; and
separating said cover and said other portions of the handheld device.

22. A handheld device comprising:
one or more catches comprising one or more wire engaging openings;
a cover comprising a clasp that comprises:
a resilient wire adapted to be selectively engaged in said one or more wire engaging openings;
a support structure that supports said resilient wire.

23. The handheld device according to claim 22 further comprising:
a moveable manual actuator engaged with said resilient wire, said moveable manual actuator being adapted to bend said resilient wire, in response to a first force, from a first configuration in which said resilient wire is engaged wit said one or more catches to a second configuration in which said resilient wire is disengaged from said one or more catches.

24. The handheld device according to claim 22 wherein said handheld device is a wireless communication device.

25. The bandheld device according to claim 24 wherein said wireless communication device is a cellular telephone.

26. A latch mechanism adapted for use in a portable electronic device, said mechanism comprising:
a first part comprising one or more catches;
a second part adapted to latch to said first part, said second part comprising:
a resilient elongated member, said resilient elongated member comprising a first end, a second end and a middle portion located between said first end and said second end;
a support structure that supports said resilient elongated member proximate said first end and proximate said second end and allows said middle portion to be deflected; and
a contact point associated with said middle portion of said resilient elongated member and adapted for receiving a deflection force, wherein the application of a deflection force is adapted to bend said resilient elongated member from a first configuration in which said resilient elongated member is engaged with said one or more catches to a second configuration in which said resilient elongated member is disengaged from said one or more catches.

* * * * *